Dec. 22, 1936.  W. L. LOMAX  2,065,384
APPARATUS FOR TREATING EGGS
Filed Feb. 13, 1934
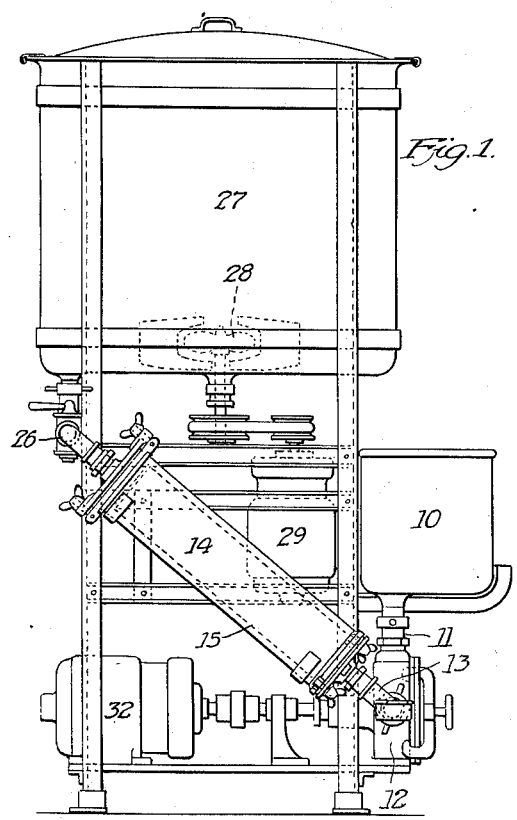
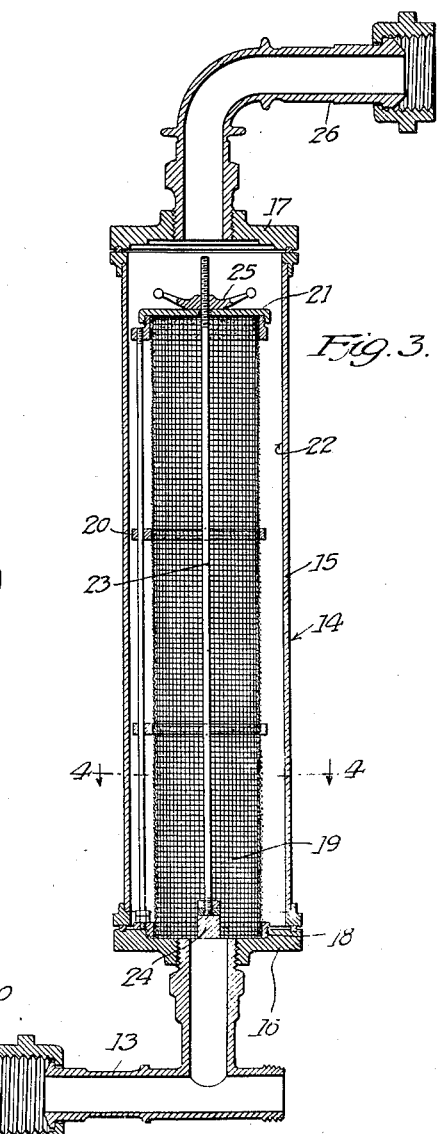
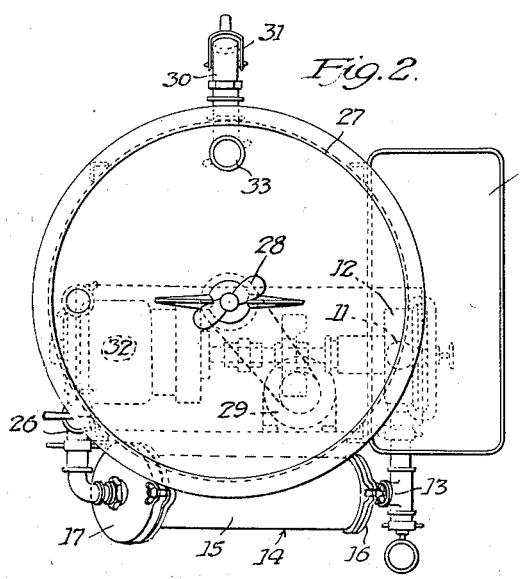
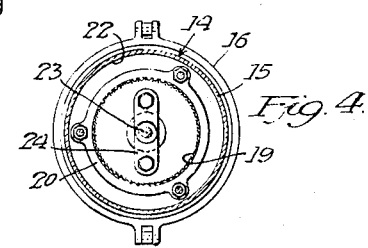
Inventor:
William L. Lomax Patented Dec. 22, 1936

2,065,384

UNITED STATES PATENT OFFICE 2,065,384

APPARATUS FOR TREATING EGGS

William L. Lomax, Chicago, Ill.; Frank B. Lomax administrator of said William L. Lomax, deceased Application February 13, 1934, Serial No. 711,002

6 Claims. (Cl. 210—154)

The present invention has to do with a process of canning eggs and relates particularly to what may be best defined as a new and novel method of concurrently mixing and filtering eggs.

Reference should be had to application, Serial Number 557,226, filed August 15, 1931, by William L. Lomax.

For a number of years, eggs have been "broken" and then canned for the market. Some of such canned eggs are kept under refrigeration until needed for use at which time the cans of eggs are opened and the egg material therein allowed to thaw. Use is had after thawing the eggs.

Whole eggs, that is, the white and the yolk in the proportions found in the natural state, or the yolks of the eggs alone, or the whites of the eggs alone, have been subjected to such canning processes. Various ingredients have been added to each of these products from time to time for obtaining special preservative and other effects. The present process has nothing to do with the addition of such ingredients to the egg material but relates to the treatment of the body of the whole egg, or the yolk, or the white, as the case may be, itself preparatory to canning.

Of the materials comprising a fresh egg and which it is advantageous to eliminate or disintegrate from canned eggs are the following: the shell, lumpy particles or materials which will not break down or disintegrate with ordinary agitation or mixing, membranous matter irregularly found in eggs, the blood spots, the skin, film or jacket about the white of the egg and between such white and the shell, the jacket or film about the yolk of the egg and separating the yoke from the white thereof, barnyard filth and other extraneous matter, and "meat balls" frequently found in eggs.

One of the desirable features of a preserved egg which the baker or other user seeks is evenness of texture and a quality of ready admixture on stirring with other eggs or egg material. The present process by eliminating all of the foregoing undesirable elements from the egg meats or by disintegrating the egg in a manner never heretofore practiced provides a product which is wholly satisfactory to the baker or other egg user.

Among the objects of the present invention are:

An improved method of obtaining a thorough mixture of egg materials, whether such material be yolk or white or the whole egg;

Better concurrent disintegration of the egg material and superior elimination and disintegration of objectionable elements, including those above described, from the egg material;

A more thorough cleansing of the egg material whether it be the whole egg, the yolk, or the whites; and A process of treatment for the eggs which is filtering or the equivalent thereof;

Thorough mixing of egg material without the addition of air to such material; and A complete breaking down of the egg texture to the extent that the treated product becomes readily miscible with other similar egg material.

These objects, and such other objects as may hereinafter appear, are obtained by the novel steps and the novel arrangement of such steps which comprise the present process and which are hereinafter described as being accomplished in a mechanical device of special design in which the process and all of the steps thereof may be effectively practiced. Such mechanical device which is but one of several apparatuses which may be employed for carrying out the process is illustrated on a sheet of drawings, hereby made a part of this specification, and in which:

Figure 1 is an elevation somewhat schematic of the hereinbefore mentioned device in which the process may be practiced;

Figure 2 is a plan view of the device shown in Figure 1, and also is somewhat schematic;

Figure 3 is a vertical longitudinal enlarged section through the filter section of the device shown in Figure 1; and Figure 4 is a transverse section on the line 4—4 of Figure 3.

Like reference characters are used to designate similar parts in the drawing and in the description of the invention which follows.

Eggs are "broken" for the present process at a breaking table in a suitable plant and in manners conventional and customary in the industry. Either the whole eggs are collected or gathered, or the whites and yolks thereof are separated at the breaking table for treatment by the present process. The material to be processed is deposited in a hopper 10 from which the material is discharged downwardly in a conduit 11 into a gear pump 12 or the like, the material under treatment being forced from the gear pump 12 into a second conduit 13 of relatively small cross section. The conduit 13 terminates in what will hereinafter be called filter 14. The gear pump may be of conventional construction, the gears being suitable for disintegrating the egg material.

Filter 14 comprises an outer casing 15. The diameter of casing 15 approximates several times that of the conduit 13. This arrangement is but one of several to obtain a large filtering area. At the ends of the casing 15 are end members 16 and 17. That at the bottom (16) of the filter casing possesses means 18 in the form of a threaded section for firmly securing a cylindrical screen or filter member 19 thereto in a leak-proof fashion.

The screen or filter member 19 generally comprises a wire mesh of selected size, say 14, 16, 18 or 20 wires to the linear inch in either direction, and extends from contiguous the bottom plate 16 to an end plate 21 upon the filter, said end plate 21 generally being a solid disc spaced from the top end 17 of the filter casing 15 approximately the same distance that the bed 19 is spaced from the cylindrical wall 22 of the filter casing 15. Meshes eighteen in number to the linear inch have been found highly effective.

In the device illustrated, the diameter of the conduit 13 is one and one-half inches, the diameter of the member 19 is approximately four inches, and the diameter of the filter casing wall 22 is approximately six inches. Suitable means 20 for reinforcing the member 19 intermediate its length and longitudinally for preventing strain thereon from producing distortion may be provided. There may be a central fastening member or bolt 23 extending longitudinally of the filter member 19 and disposed upon a bridge 24 to hold the filter member 19 in position on end member 16. The bolt 23 extends through disc 21. An adjustable wing nut 25 is rotatable upon said center fastening member or bolt 23 to frictionally engage the closed end or disc 21 of the filter. The bolt 23 and its aperture fit relatively close to one another.

From the end plate 17, a second conduit 26 conveys material which has been filtered into what may be called a storage and mixing tank 27.

Within the tank is a mixing paddle 28 rotating preferably on an axis concentric with the axis of the tank and driven by motor 29. Normally, the paddle 28 operates under the level of material in the tank 26 so that under no condition is such confined material splashed or aerated. A valve 30 with operating handle 31 may be disposed in conduit 26 to shut off any possible back flow from the tank. A motor 32 with suitable drive actuates the gear pump. A discharge pipe and faucet 33 allow withdrawal of the contents of the tank 27.

As the material, whole eggs, yolks or whites, is poured into the hopper 10, it fills the conduit 11 and flows to the pump 12 where it is disintegrated to a limited degree with relatively little churning by the teeth or gears of the pump, the pump being driven by motor 32. The passage of the material through the pump 12 is helpful for breaking up the larger lumpy materials or balls and large pieces of shell and in creating a pressure in conduit 13 and thereabove to drive material through the filter 14 and in the present structure upwardly.

From the pump 12 such material is moved always against back pressure. The back pressure is derived from the weight of the column of material ahead of or above the material in the conduit 13. Such back pressure is governed by the depth of material within the storage tank 27.

Against such back pressure, the material to be mixed and filtered is forced by pump 12 through member 19 into the space between the member 19 and the filter wall 22. As the casing 15 is filled, the filtered and mixed material is forced upwardly in the filter casing 15 and thereout of and into the conduit 26 thereabove. The material enters the bottom of the storage tank 27. There it may be subjected to agitation, if any is desired or required. It is for regulating the amount of agitation that motor 29 is supplied so that the stirring paddle may be operated independently of motor 32 and only when desired.

All of the movements of the material from the gear pump 12 into the storage tank 27 are in a manner which excludes air from the apparatus and from the eggs and for a part of the journey the movement is under the further pressure required to force the material through the member 19 of the filter 14 and any foreign material accumulated thereon.

It is possible, by maintaining a constant quantity of material in the hopper 10, by regular loadings of the egg material thereinto, to prevent admission of air into the eggs during treatment and thus avoid foaming.

As the eggs are drawn off into cans by way of discharge pipe and faucet 33, there is brief contact with the atmosphere but if such "drawing off" is conducted in a careful manner, no objectionable aerating or foaming of the eggs will occur.

As heretofore pointed out, the material may be partly disintegrated in the gear pump 12 so that coarser particles are reduced in size and the whole mass churned in a limited degree. In the filter, the coarser particles partially broken up in the gear pump and other particles of the material not affected in the gear pump, will be disintegrated to a high degree by the filter member 19 so that the material which flows into the bottom of the tank 27 is thoroughly disintegrated and mixed, all of the lumpy parts of the egg material being either liquefied and thoroughly mixed or removed.

Before the filtered and completely mixed material is treated to the effects of the mixing paddle 28, the egg structure has been so completely broken down that it is a homogeneous liquid of uniform color and texture, features highly desired by the egg packer because demanded by the trade which he supplies.

While the precise effects of the gear pump disintegration, the filtration, and the mixing described upon the various constituents of the egg material is not definitely known beyond the possibility of error, it is believed that the following results are obtained by the process hereinabove described.

Egg shells which get into the eggs during the process of breaking may be further broken in the gear pump and passed therethrough but are arrested at the filter. Experiment has disclosed no palpable particles of shell in the storage tank. The present process, therefore, completely rids the egg of the heretofore frequently met and highly objectionable shell.

Barnyard filth and other extraneous solid matters, even though broken up or partially disintegrated in the gear pump, are separated from the egg material in the filter in the same manner as egg shell and do not reach the storage tank.

The effect of the filtering and gear pump upon chalaza has not yet been definitely determined. All or some of the chalaza may be filtered out. All or portions thereof may be thoroughly disintegrated, so thoroughly that some of it may flow through the filter. In any event, that portion of the chalaza, if any, which is in the filtered meats, is so changed structurally that it has no tendency to produce lumps, stringiness, or other undesirable physical features in such finished product.

Meat balls and lumpy particles and membranous matter are thoroughly disintegrated either in the pump, or failing of disintegration there, they are either broken into readily miscible material in the filter or arrested in such filter.

The blood spot, if it is not entirely arrested in the filter or in the filter bed, passes through the filter so completely reduced in sized and disintegrated that it readily mixes with and becomes an indetectable part of the homogeneous liquid obtained by the agitation in the storage tank.

If any of the jacket between the white of the egg and the shell enters the mixture, it is so disintegrated therein that it cannot be detected in the filtered and mixed product, or it is removed by member 19.

The film or sack which surrounds the yolk and separates it from the white of the egg apparently is so thoroughly disintegrated or so structurally modified that it cannot be identified in the finished product or it is so completely removed in the filter that it does not pass into the finished product.

In the practice of the herein described process, close observation has been had of the effect of the filter upon the several products, as hereinabove indicated, and also upon the operation and function of the filter during its use in the process. As previously stated, the filter comprises a wire mesh 19 of approximately 14, 16, 18 or 20 (preferably 18) wires to the linear inch in each direction. A square mesh is effective.

When the filter is fresh, it is not covered with any foreign material. The filtering effect then is due entirely to the wire screen. After a portion of the foreign material which is separated from the egg material has collected upon the interior of the screen 19, it produces a filter bed which extends through the mesh of screen 19 to the other side thereof. There is thus formed, during use, a filter bed which has for its body and support the wire screen 19 but which may depend for some of its efficiency upon the partial clogging of the pores of the bed by the materials removed from the egg material. Thus the sack about the yolks, the chalaza, and that portion of the blood spot that adheres to the screen may provide an additional effective filtering bed.

The filtered out substances when they coat the metallic bed 19 produce a porous elastic bed which may obtain considerable depth at each side of the wire screen 19. Through this elastic bed, the whole meats, the whites or yolk, must pass. A filter will last for half a day in respect to egg whites without removal for cleansing. The screen 19 which is readily removable as indicated above is more frequently changed and cleansed in respect to the yolks of the eggs and whole eggs than for whites.

The wire screen of itself, with or without the bed of separated material, is a good filter and an adequate mixer. The material which passes through the filter here described is so thoroughly mixed that churns of all characters may be eliminated. Even without a gear pump to partially disintegrate the material, the screen 19 is sufficient for thorough mixing of the materials. The paddle 28 is useful only to prevent subsequent separating. Such a filter as has been described reduces the recovered white and yolk to such a fine state of division that it is readily miscible. The whites when run through the filter reform in a homogeneous material similar or identical in texture with unfiltered whites.

The area of bed 19 of the filter 14 is a number of times the area of a cross section of conduit 13. It may be several times the cross sectional area of the discharge conduit 26 from said filter. The discharge conduit 26 perhaps need not be of the same diameter as the first or feeding conduit 13 but apparently effectiveness is augmented by coursing the eggs through a conduit of reduced diameter both prior to entry into the filter and also subsequent to passage through such filter. The present structure is but one by which an effective filtering area of comparatively large size in combination with a small stream of material may be obtained.

In the present device the amount of agitation of the eggs is reduced to a minimum. In the gear pump, there is slight agitation. It is different from the agitation which has heretofore been practiced upon egg meats, namely churning, there being present no plurality of paddles and blades rotating at high speed in a container partly filled (or ideally, fully filled) with the egg meats, hence there can be no beaten material in the present process. All egg material which is recovered in the present process is reduced or compressed by squeezing it through a filter bed. It is not allowed to expand as an incident to a beating or pounding in a churn.

In the course through the filter the flow of the egg meats is definitely diverted by the disc 21 at the end of the bed 19 so that the egg meats must, of necessity, be subjected to angular displacement normal to the path through the conduits, then parallel to such path, thereafter normally thereto, and then into the second conduit 26.

Thus the filter provides an area of bed which is a large multiple of the cross sectional area of the normal stream of egg meats fed to such bed. The flow of such egg meats is under pressure, and is around corners so to speak, and there is in the conduit system an expansion chamber which comprises the shell 15 and the end members 16 and 17.

Experiment has disclosed that a filter of substantially the area of the cross section of the stream of flow and transverse thereof is impracticable and does not function, hence it appears important in the process that the filtering bed be extensive when compared with the cross sectional area of the conduit conveying the egg meats thereto. It may be important also that the direction of flow of the materials be altered in sharp angles and that there be an expansion chamber, like chamber 15, as a part of the conduit system. Evenness of distribution of the separated foreign matter is accomplished in the present arrangement of filter and conduits, this extending over the entire member 19.

The apparatus illustrated is, of course, but one form of apparatus in which the process may be practiced. Other forms of apparatus readily suggest themselves.

What is claimed as new and is desired to be secured by Letters Patent of the United States is:

1. In an egg meat filtering and treating apparatus, a reception vessel for the egg material, a filter of foraminous material through which the egg material can be forced, a conduit having a cross sectional area which is relatively small with respect to the filtering area of said filter and which communicates with the receiving side of said filter, and means for forcing the egg material from said reception vessel through said filter and against a back pressure applied to the material in the filter which is greater than atmospheric pressure, the material forced through said filter being above said receiving side.

2. In an egg meat treating and filtering apparatus, a foraminous member, a chamber for said member and from which air is excluded during the treating of egg meats, means for circulating egg meats through said member to build up a filter bed on said member consisting of particles of foreign matter, egg shells, and egg chalaza, and means for conducting the filtered egg product without agitation away from said member and filter bed, said apparatus having on the discharge side of said member a mass of filtered egg material disposed above an inlet to said chamber so as to cause a back pressure to be applied against the egg material entering said member.

3. Egg filtering apparatus comprising in tandem intercommunicating arrangement, a reception vessel, a pump, a cylinder of large capacity having therein a large area filter cylinder of foraminous metal, a stirring vessel, and a discharge outlet, said first mentioned cylinder being so connected to said pump that egg material forced therethrough by said pump is positioned above the discharge side of the pump to cause a back pressure to be applied against the material in the filter cylinder.

4. Egg filtering apparatus comprising in tandem intercommunicating arrangement a reception vessel, a pump, a cylinder of large capacity having therein a large area filter cylinder of foraminous metal, a stirring vessel and a discharge outlet, said pump being connected on its discharge side to the receiving side of said first mentioned cylinder by a conduit having a cross sectional area which is relatively small with respect to the filtering area of said filter cylinder and said pump being adapted to force egg material through said conduit and said filter cylinder with a pressure in excess of atmospheric pressure.

5. Egg filtering apparatus comprising in tandem intercommunicating arrangement a reception vessel, a pump, a cylinder of large capacity having therein a large area filter cylinder of foraminous metal, a stirring vessel and a discharge outlet, said pump being connected on its inlet side to said reception vessel to receive egg material therefrom and including an impeller for breaking up the egg material and for positively impelling it under pressure in excess of atmospheric pressure to and through the filter cylinder, whereby a filter of egg meats is built up on said filter cylinder and the broken-up egg material is thereafter pressed through said built-up filter by the action of said pump impeller.

6. Egg filtering apparatus comprising in tandem intercommunicating arrangement a reception vessel, a pump, a cylinder of large capacity having therein a large area filter of foraminous material, and a discharge outlet, said pump being connected on its inlet side to said reception vessel to receive egg material therefrom and including an impeller for breaking up the egg material and for positively impelling it under pressure in excess of atmospheric pressure to and through the filter, whereby a filter of egg meats is built up on said filter and the broken-up egg material is thereafter pressed through said built-up filter by the action of said pump impeller.

WILLIAM L. LOMAX.